(12) United States Patent
Mai et al.

(10) Patent No.: US 11,742,759 B2
(45) Date of Patent: Aug. 29, 2023

(54) VOLTAGE CONVERTER WITH LOOP CONTROL

(71) Applicant: TEXAS INSTRUMENTS INCORPORATED, Dallas, TX (US)

(72) Inventors: Junjie Mai, Beijing (CN); Weibing Jing, Beijing (CN); Jian Guo, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/130,775

(22) Filed: Dec. 22, 2020

(65) Prior Publication Data

US 2022/0200457 A1 Jun. 23, 2022

(51) Int. Cl.
*H02M 3/158* (2006.01)
*H02M 1/15* (2006.01)

(52) U.S. Cl.
CPC ........... *H02M 3/1584* (2013.01); *H02M 1/15* (2013.01)

(58) Field of Classification Search
None
See application file for complete search history.

(56) References Cited

U.S. PATENT DOCUMENTS

| | | | | |
|---|---|---|---|---|
| 7,230,406 B2* | 6/2007 | Huang | ........... | H02M 3/158 |
| | | | | 323/284 |
| 9,148,917 B2* | 9/2015 | Omi | ........... | H05B 45/38 |
| 9,553,513 B2* | 1/2017 | Xu | ........... | H02M 3/156 |
| 10,056,830 B2* | 8/2018 | Hu | ........... | H02M 3/156 |
| 2007/0001655 A1* | 1/2007 | Schiff | ........... | H02M 3/158 |
| | | | | 323/246 |

* cited by examiner

*Primary Examiner* — Jeffrey A Gblende
(74) *Attorney, Agent, or Firm* — Ray A. King; Frank D. Cimino (57) ABSTRACT

A voltage converter system includes a switch adapted to be coupled to an inductor, and configured to switch between first and second states responsive to a control signal. Calibration circuitry is configured to generate a calibration signal, including setting the calibration signal to a particular value for a particular time responsive to a transient from a first load condition of the voltage converter system to a second load condition of the voltage converter system. Control circuitry is coupled to the calibration circuitry and configured to generate the control signal based on a combination of a feedback voltage, a reference voltage, the calibration signal, and a periodic signal.

14 Claims, 7 Drawing Sheets

VOLTAGE CONVERTER WITH LOOP CONTROL

TECHNICAL FIELD

This description relates generally to integrated circuits, and more particularly to a voltage converter system with ripple-based loop control.

BACKGROUND

DC-DC converters are useful to convert an input DC voltage to a desired output DC voltage to drive a load. A DC-DC converter with loop control may include a switch coupled to a switch terminal of the DC-DC converter, and a feedback loop that: generates a ripple signal in phase with an inductor current flowing through an inductor coupled to the switch terminal; and determines on or off time of the switch in each switching cycle based on a combination of the ripple signal and a feedback voltage of the output DC voltage, thereby regulating the output voltage.

The DC-DC converter may operate in a discontinuous conduction mode (DCM) or a continuous conduction mode (CCM) depending on a load condition of the DC-DC converter. In one control paradigm, the switch is switched between on and off states based on a peak value or a valley value of the combination of the ripple signal and the feedback voltage.

SUMMARY

A voltage converter system includes a switch adapted to be coupled to an inductor, and configured to switch between first and second states responsive to a control signal. Calibration circuitry is configured to generate a calibration signal, including setting the calibration signal to a particular value for a particular time responsive to a transient from a first load condition of the voltage converter system to a second load condition of the voltage converter system. Control circuitry is coupled to the calibration circuitry and configured to generate the control signal based on a combination of a feedback voltage, a reference voltage, the calibration signal, and a periodic signal.

DETAILED DESCRIPTION OF EXAMPLE EMBODIMENTS

This description relates to DC-DC converter systems with loop control.

Figure 1:
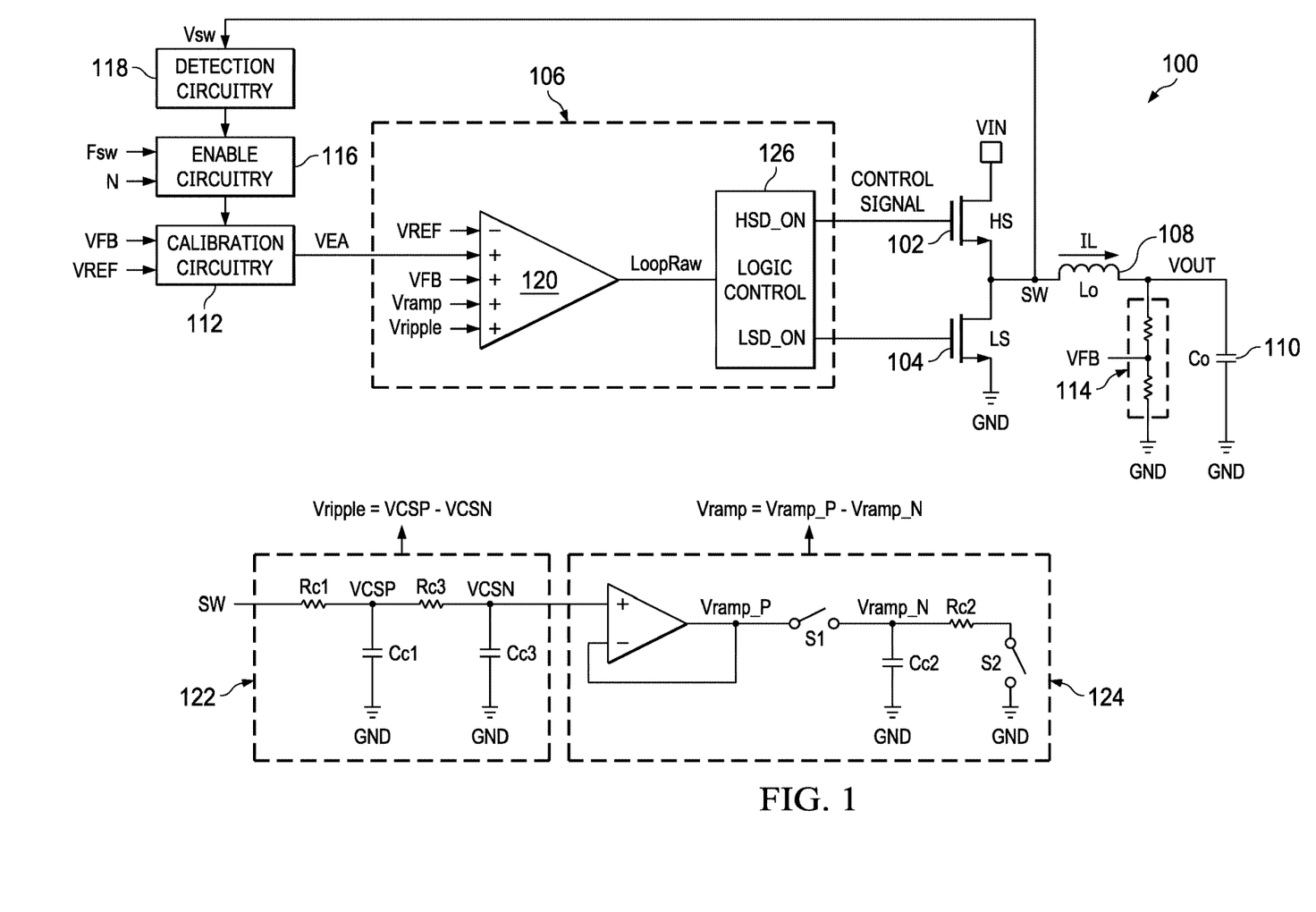
FIG. 1 is a schematic block diagram of a DC-DC converter system in accordance with an implementation of this description.

FIG. 1 is a schematic block diagram of a DC-DC converter system 100 in accordance with an implementation of this description. More particularly, FIG. 1 shows a buck DC-DC converter system configured to operate in: (a) a first control mode, such as valley-ripple-based discontinuous conduction mode (DCM) when a load of the DC-DC converter is light; and (b) a second control mode, such as valley-ripple-based continuous conduction mode (CCM) when the load is heavy.

The converter system 100 includes: (a) a first switch 102 coupled between a switch terminal SW and an input terminal VIN of the converter system 100, thereby allowing a current flowing from the input terminal VIN to the switch terminal SW when the first switch 102 is on; and (b) a second switch 104 coupled between the switch terminal SW and a voltage supply terminal, such as a ground terminal GND. The converter system 100 also includes control circuitry 106 coupled to the first and second switches 102 and 104, and configured to generate control signals HSD_ON and LSD_ON to alternately switch the first and second switches 102 and 104 between a first state, such as an on state, and a second state, such as an off state, thereby allowing a current to flow from the input terminal VIN to the switch terminal SW towards an output terminal VOUT of the converter system 100, and from the ground terminal GND to switch terminal SW towards an output terminal VOUT. The first and second switches 102 and 104, also named respectively as high side and low side switches, can be transistors, such as metal oxide semiconductor field effect transistors (MOSFETs), which are respectively controlled by the control signals HSD_ON and LSD_ON received from the control circuitry 106. The converter system 100 also includes: an output inductor 108 coupled between the switch terminal SW and the output terminal VOUT; and an output capacitor 110 coupled between the output terminal VOUT and the ground terminal GND.

In one example, the converter system 100 further includes calibration circuitry 112 coupled to the control circuitry 106, and configured to generate a calibration signal VEA by integrating a difference between a reference voltage VREF and a feedback voltage VFB proportional to a voltage at the output terminal VOUT. In one example, the feedback voltage VFB is generated by feedback circuitry 114 coupled to the output terminal VOUT. The feedback circuitry 114 including a voltage divider can be either integral with or separate from the converter system 100.

The converter system 100 further includes enable circuitry 116 coupled to the calibration circuitry 112, and configured to: set the calibration signal VEA to a particular value for a particular time period responsive to detecting a transient from a first load condition to a second load condition of the converter system 100. In one example, a load in the first load condition is smaller than a load in the second load condition. In one example, the enable circuitry 116 is configured to: (a) disable and reset the calibration circuitry 112 responsive to a detection signal indicating a transient from a light load condition to a heavy load condition of the converter system 100; and (b) enable the calibration circuitry 112 the particular time period after the disabling.

In one example, the converter system 100 further includes detection circuitry 118, coupled between the switch terminal SW and the enable circuitry 116, and configured to generate the detection signal responsive to detecting the transient from the light load condition to the heavy load condition. In one example: (a) in the light load condition, a valley value of an inductor current IL of the output inductor 108 (which flows from the switch terminal SW to the output terminal VOUT) is below zero when the second switch 104 is on; and (b) in the heavy load condition, the valley value of the inductor current IL of the output inductor 108 (which flows from the switch terminal SW to the output terminal VOUT) is above zero when the second switch 104 is on. The transient from the light load condition to the heavy load condition is detected by detecting the valley value of the inductor current IL increasing above zero when the second switch 104 is on. In one example of this description, the detection circuitry 118 is configured to generate the detection signal based on detecting a voltage VSW at the switch terminal SW becoming less than zero when the second switch 104 is on. Other implementations for determining the light load condition and heavy load condition are also applicable in the detection circuitry 118.

The control circuitry 106 includes loop control circuitry 120 configured to generate a loop control signal LoopRaw based on the feedback voltage VFB, the reference voltage VREF, a periodic signal, such as a ripple signal representative of the inductor current IL of the output inductor 108, and the calibration signal VEA. In one example, the control circuitry 106 also includes a ripple signal generator 122 coupled to the switch terminal SW and configured to provide the ripple signal Vripple in phase with the inductor current IL based on a voltage VSW at the switch terminal SW. The ripple signal Vripple is a combination of output voltage signals VCSP and VCSN generated by the ripple signal generator 120, such as Vripple=VCSP−VCSN. In another example, the converter system 100 further includes a ramp signal generator 124 coupled to the ripple signal generator 122 and configured to provide a ramp signal Vramp to compensate the ripple signal Vripple, wherein Vramp=Vramp_P−Vramp_N. In one example, the switches S1 and S2 of the ramp signal generator 124 are controlled based on the status of the high side and low side switches 102 and 104. For example, in CCM: (a) the switch S1 is switched on and the switch S2 is switched off when the high side switch 102 is switched off and the low side switch 104 is switched on; and (b) the switch S1 is switched off and the switch S2 is switched on when the high side switch 102 is switched on and the low side switch 104 is switched off.

The control circuitry 106 further includes logic control circuitry 126 coupled to the loop control circuitry 120 and configured to generate the high side and low side drive signals HSD_ON and LSD_ON based on the loop control signal LoopRaw.

The DC-DC converter system 100 is a buck converter, but other architectures of DC-DC converter systems are possible to regulate the output voltage based on the feedback voltage VFB and the ripple signal Vripple. The DC-DC converter systems can operate in constant on-time or constant off-time mode with dynamic switching frequency, or operate in a fixed frequency mode. The DC-DC converter systems can operate based on a valley of the ripple signal, or a peak of the ripple signal.

Figure 2:
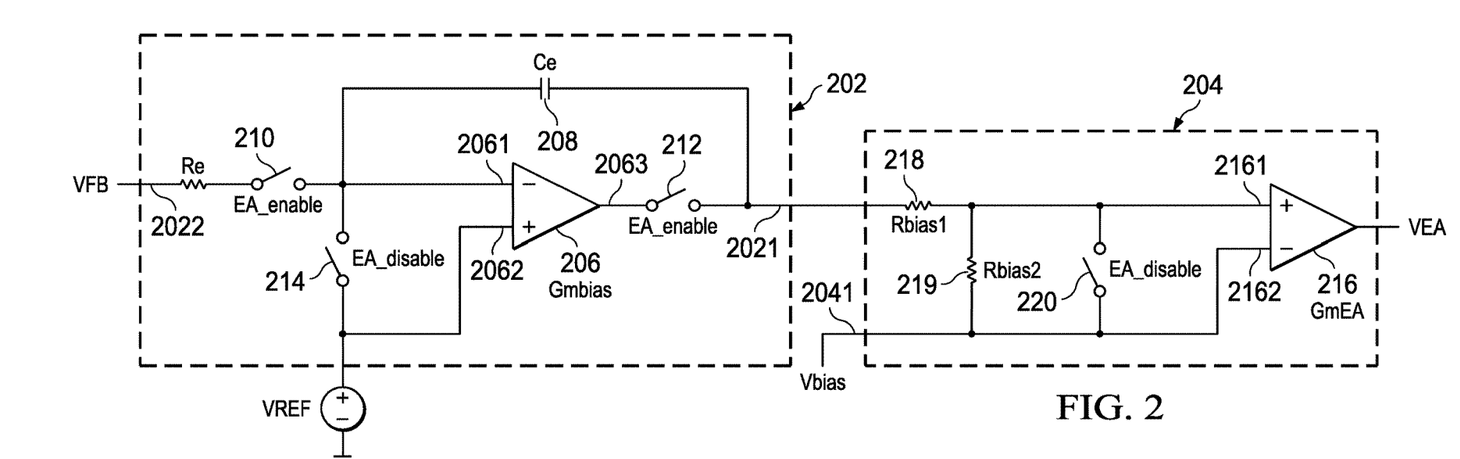
FIG. 2 is a schematic circuit diagram of calibration circuitry in accordance with an implementation of this description.

FIG. 2 is a schematic circuit diagram of calibration circuitry 200 in accordance with an implementation of this description. In one example, the calibration circuitry 200 of FIG. 2 is an example of the calibration circuitry 112 of FIG. 1.

The calibration circuitry 200 includes: (a) an integrator 202 configured to generate an integrated signal by integrating the difference between the feedback voltage VFB and the reference voltage VREF; and (b) output circuitry 204, coupled to the integrator 202, and configured to generate the calibration signal VEA proportional to the integrated signal and large enough to drive subsequent circuitry coupled thereto.

In one example, the integrator 202 includes: (a) a first error amplifier 206 having a first input terminal 2061 (such as an inverting input terminal) configured to receive the feedback voltage VFB, a second input terminal 2062 (such as a non-inverting input terminal) configured to receive the reference voltage VREF, and an error amplifier output terminal 2063; and (b) a capacitor 208 coupled between the inverting input terminal 2061 and an output terminal 2021 of the integrator 202. The integrator 202 also includes: (a) a first enable switch 210 coupled between an input terminal 2022 configured to receive the feedback voltage VFB and the inverting input terminal 2061 of the first error amplifier 206; (b) a second enable switch 212 coupled between the error amplifier output terminal 2063 and the output terminal 2021 of the integrator 202; and (c) a first disable switch 214 coupled between the inverting and noninverting input terminals 2061 and 2062 of the first error amplifier 206. The first and second enable switches 210 and 212 are controlled by an enable signal EA_enable, and the first disable switch 214 is controlled by a disable signal EA_disable inverted from the enable signal EA_enable. Accordingly: (a) the first and second enable switches 210 and 212 are switched on, and the first disable switch 214 is switched off, to enable the integrator 202 when the enable signal EA_enable is asserted; and (b) the first and second enable switches 210 and 212 are switched off, and the first disable switch 214 is switched on, to disable and reset the integrator 202 when the disable signal EA_disable is asserted.

In one example, the output circuitry 204 includes: (a) first and second bias resistors Rbias1 218 and Rbias2 219 coupled in series between the output terminal 2021 of the integrator 202 and the bias voltage terminal Vbias 2041; (b) a second error amplifier 216 having a first input terminal 2161 (such as a non-inverting input terminal) coupled to a joint node between the first and second bias resistors Rbias1 218 and Rbias2 219, and a second input terminal 2162 (such as an inverting input terminal) coupled to the bias voltage terminal Vbias 2041; and (c) a second disable switch 220 coupled between the non-inverting and inverting input terminals 2161 and 2162 of the second error amplifier 216, and configured to short the inverting and noninverting input terminals 2161 and 2162 based on the disable signal EA_disable. The output circuitry 204 produces the calibration signal VEA proportional to the integrated signal and large enough to drive subsequent circuitry coupled thereto.

Figure 3:
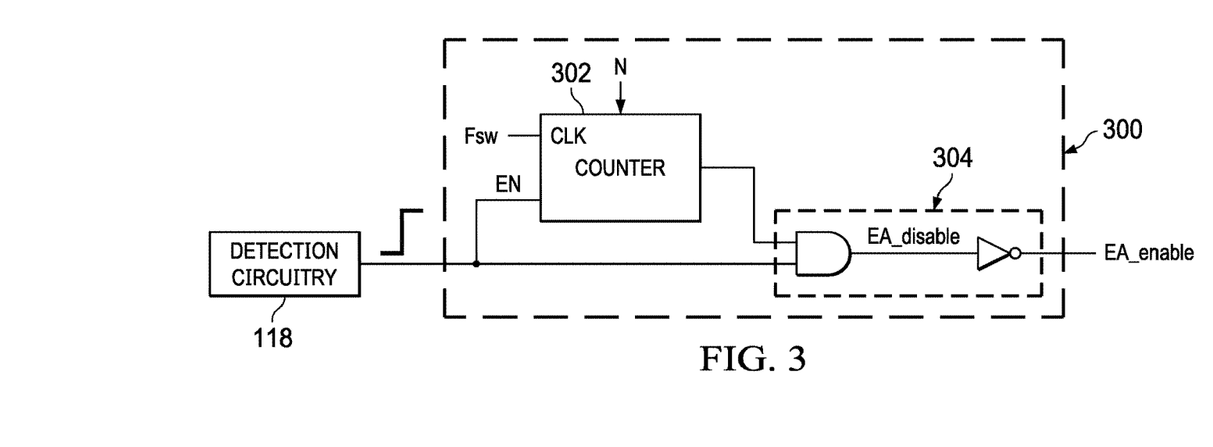
FIG. 3 is schematic circuit diagram of enable circuitry in accordance with an implementation of this description.

FIG. 3 is a schematic circuit diagram of enable circuitry 300 in accordance with an implementation of this description. In one example, the enable circuitry 300 of FIG. 3 is an example of the enable circuitry 116 of FIG. 1. In one example, the enable circuitry 300 includes a counter 302 having: an enable terminal configured to receive the detection signal from the detection circuitry 118; and a clock input terminal configured to receive a clock signal, such as a clock signal with a switching frequency Fsw of the converter system 100. The counter 302 is enabled responsive to assertion of the detection signal generated by the detection circuitry 118, which is responsive to the transient from the light load condition to heavy load condition. The counter 302 is configured to generate a timing signal a particular number of cycles (such as N cycles, wherein N is an integer greater than zero) of the clock signal after the counter 302 is enabled. In one example, the particular number N can be configured and provided to the counter 302 through an input terminal. In one example, the particular number N is determined based on a loop delay of the converter system 100. The particular number N can be a fixed value, such as eight. The enable circuitry 300 also includes logic circuitry 304 coupled to the counter 302 and the detection circuitry 118, and configured to generate the enable and disable signals EA_enable and EA_disable. The disable signal EA_disable is asserted, and the enable signal EA_enable is de-asserted, when the detection signal generated by the detection circuitry 118 is asserted. The disable signal EA_disable is de-asserted, and the enable signal EA_enable is asserted, when the timing signal generated by the counter 302 is asserted.

Figure 4:
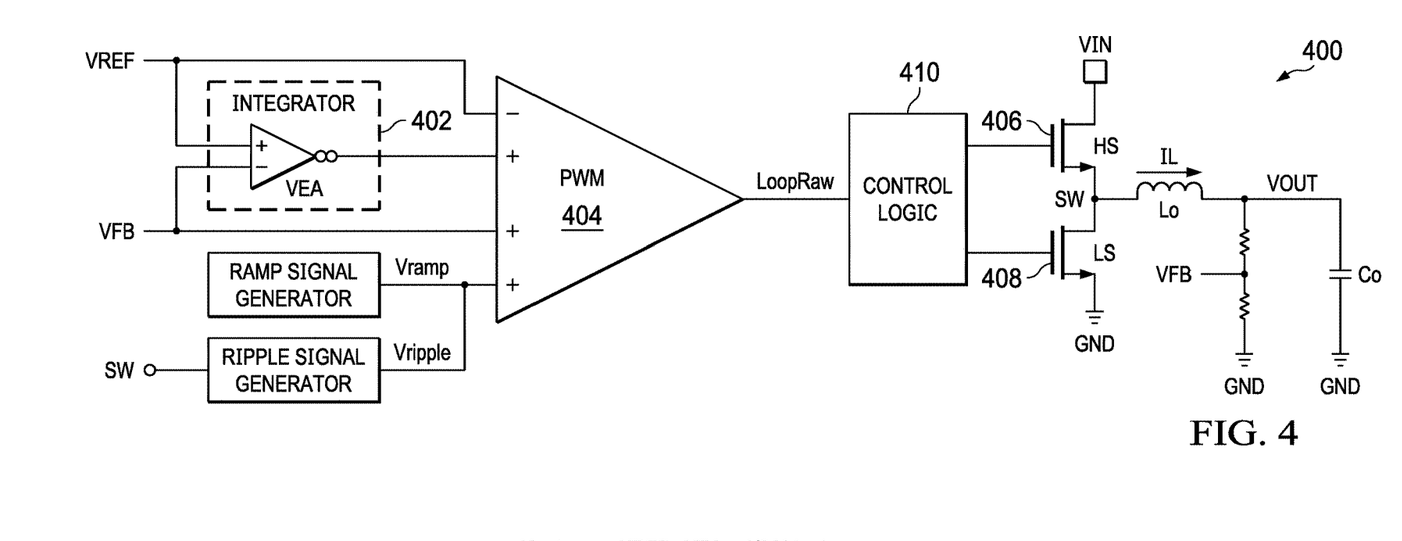
FIG. 4 is a schematic circuit diagram of a DC-DC converter with an integrator operating independently from a load condition of the DC-DC converter.

FIG. 4 is a schematic circuit diagram of a DC-DC converter 400 with an integrator 402 operating independently from a load condition of the DC-DC converter 400. The DC-DC converter 400 is similar to the DC-DC converter system 100 of FIG. 1, except the integrator 402 operates independently from the load condition of the DC-DC converter 400. The integrator 402 is configured to generate a calibration signal VEA by integrating a voltage difference between a feedback voltage VFB and a reference voltage VREF. The DC-DC converter 400 also includes a comparator 404 coupled to the integrator 402 and configured to generate a control signal based on a combination of the reference voltage VREF, the calibration signal VEA, the feedback voltage VFB, the ramp signal and the ripple signal Vripple. The high side and low side switches 406 and 408 are controlled by a control logic 410 based on the control signal.

Figure 5:
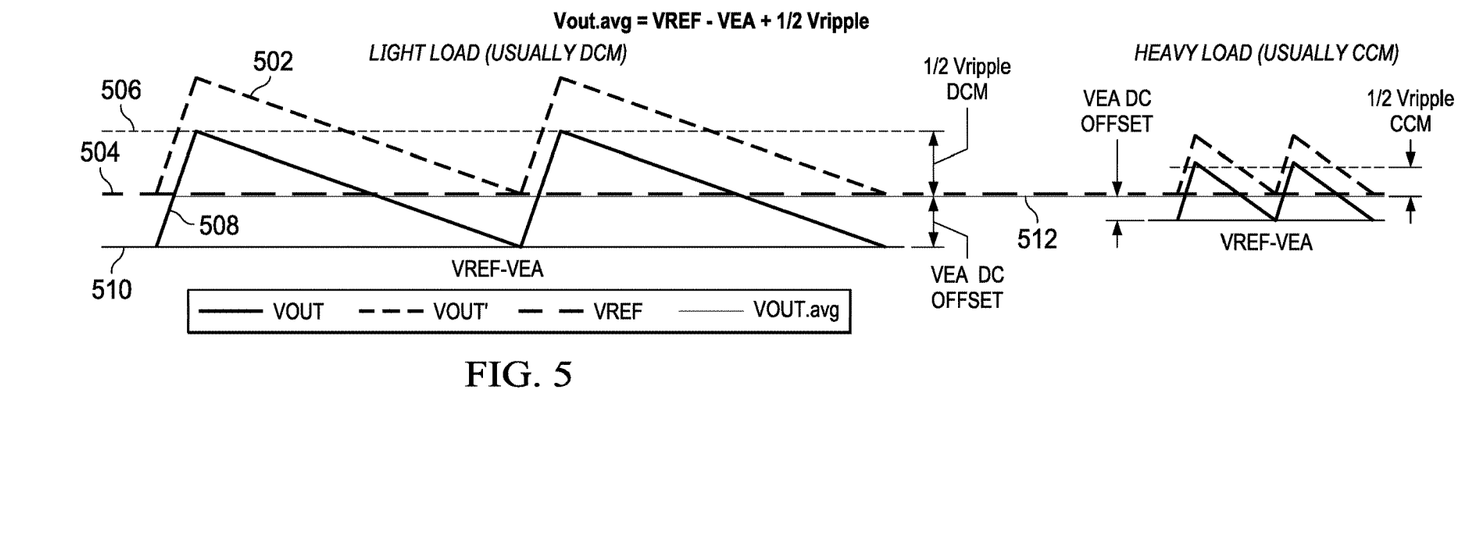
FIG. 5 is an illustrative diagram of waveforms of a DC-DC converter operating in a light load condition and in a heavy load condition.

FIG. 5 is an illustrative diagram 500 of waveforms of output voltage VOUT of a DC-DC converter operating in a light load condition and in a heavy load condition.

For the light load condition as an example in a DC-DC converter without an integrator to calibrate the output voltage VOUT', a half ripple shift exists between the average output voltage 506 and the reference voltage VREF 504, because the valley of the output voltage VOUT' 502 is limited by the reference voltage VREF 504. By employing the integrator 402 of the DC-DC converter 400 in FIG. 4, a DC offset VEA is provided, and the valley of the output voltage VOUT 508 is limited by a difference voltage 510 between the reference voltage VREF and the calibration signal VEA, such that the calibrated average output voltage 512 is substantially equal to the reference voltage VREF 504. In light load condition, the DC-DC converter operates in DCM mode instead of CCM mode to improve efficiency. As shown in FIG. 5, the amplitude of a ripple signal in DCM mode is greater than the amplitude of a ripple signal in CCM mode, and the switching frequency in DCM mode is lower than in CCM mode.

Figure 6A:
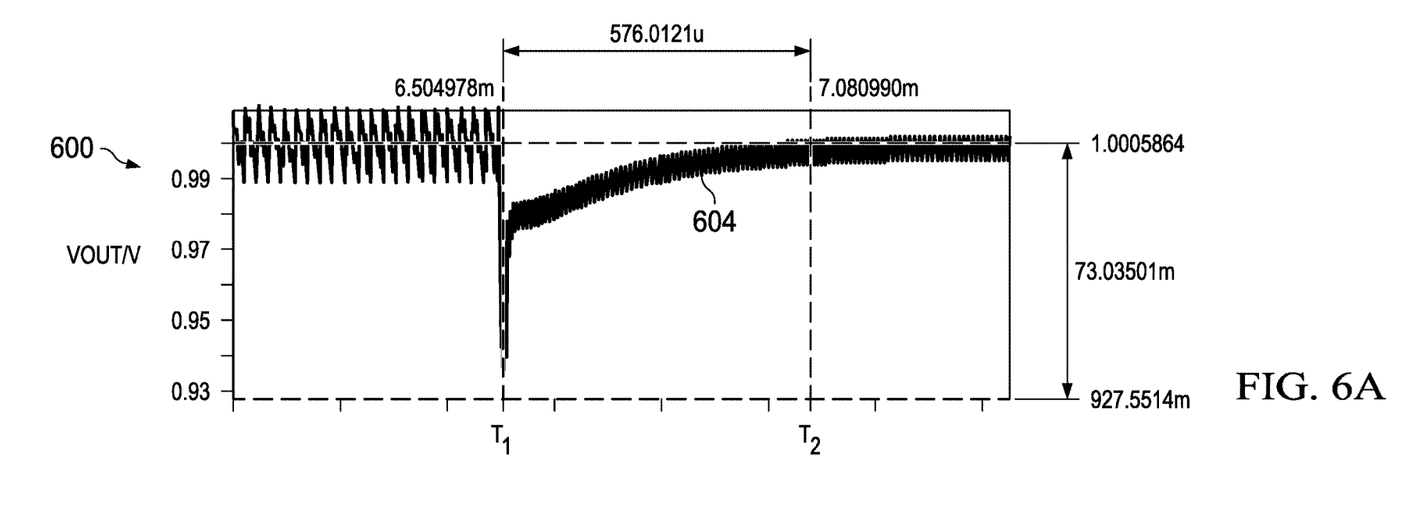
FIG. 6A is a diagram of a simulation waveform of a DC-DC converter of FIG. 4 switching from a light load condition and to a heavy load condition.
Figure 6B:
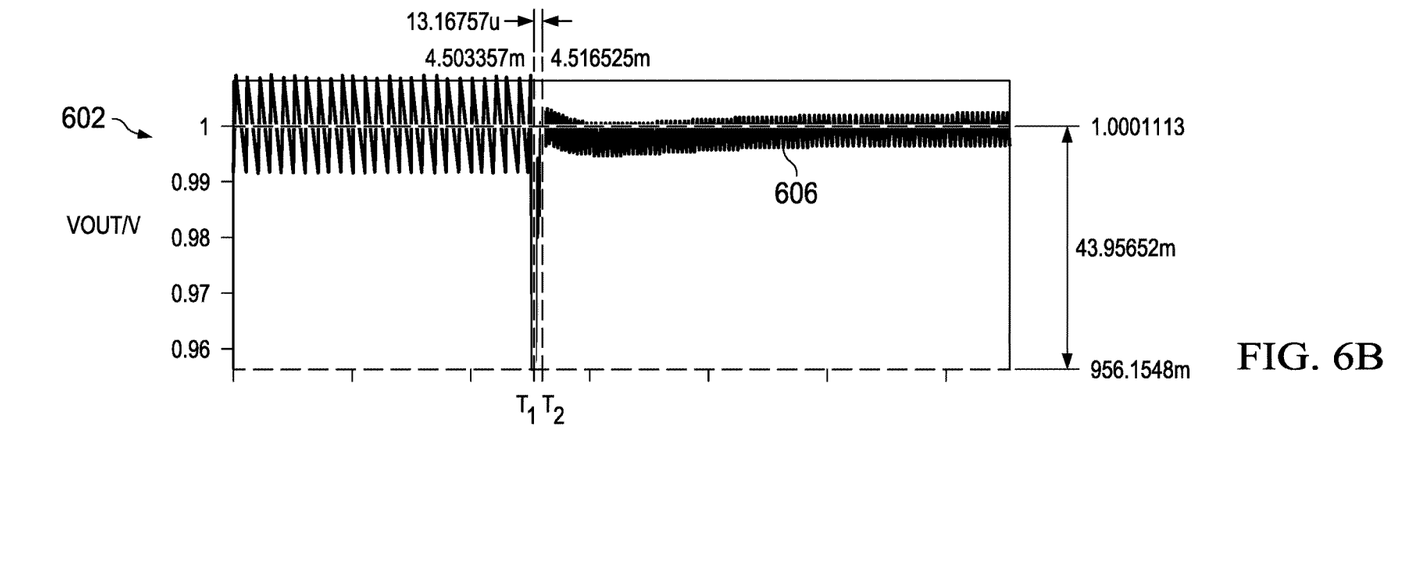
FIG. 6B is a diagram of a simulation waveform of a DC-DC converter of FIG. 1 switching from a light load condition and to a heavy load condition.

FIGS. 6A and 6B respectively show a diagram 600 and 602 of a simulation waveform of an output voltage VOUT 604 and 606 of a DC-DC converter 400 of FIG. 4 and a DC-DC converter system 100 of FIG. 1, in transient from a light load condition to a heavy load condition, in which VIN=12V, VOUT=1V, Lo=0.68 µH, Co=110 µF, and output current ranges from 0.1 A to 8 A with load step under a slew rate of 1.6 A/µs. As shown in FIG. 6A, the undershoot voltage during the transient of the DC-DC converter 400 is 73 mV, and the recovery time period is 576 µs. As shown in FIG. 6B, because the integrator 202 is reset and disabled at the beginning of the transient, the reference voltage to regulate the output voltage VOUT is raised from VREF-VEA to VREF, which reduces the undershoot voltage to 44 mV. Also, in the DC-DC converter 400, the integrator 402 operates independently from the load condition, and the integrator 402 gradually adjusts the calibration signal VEA to meet the half ripple of the ripple voltage in the CCM mode. However, in the converter system 100 of FIG. 1, the integrator 202 is disabled and reset, and enabled a particular time after the disabling. As compared to the DCM mode, in the CCM mode: the DC-DC converter system 100 has a smaller DC offset; the integrated signal when the feedback voltage VFB reaches to the reference voltage VREF is nearer the output of the integrator when the integrator is reset; and the recovery time period is reduced to 13 µs.

Figure 7A:
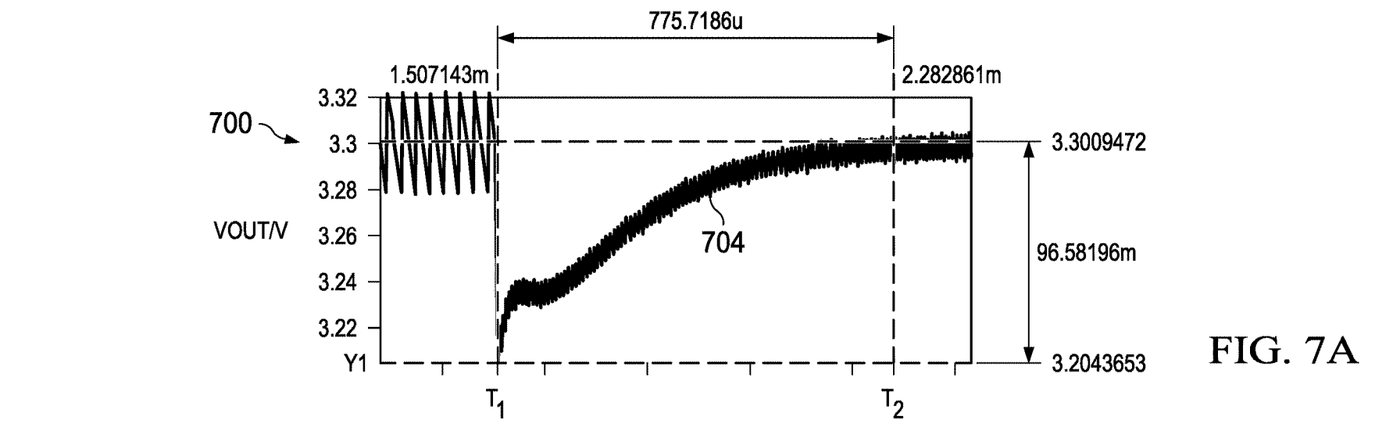
FIG. 7A is another diagram of a simulation waveform of a DC-DC converter of FIG. 4 switching from a light load condition and to a heavy load condition.
Figure 7B:
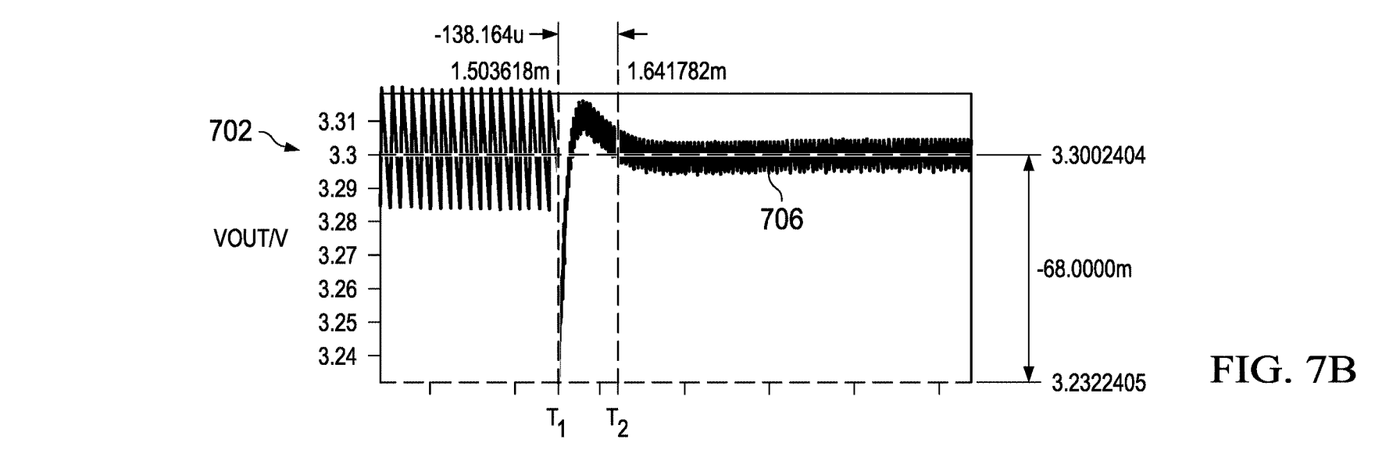
FIG. 7B is another diagram of a simulation waveform of a DC-DC converter of FIG. 1 switching from a light load condition and to a heavy load condition.

FIGS. 7A and 7B show diagrams 700 and 702 of another light load to heavy load transient simulation comparison between output voltages 704 and 706 of the DC-DC converter 400 of FIG. 4 and the converter system 100 of FIG. 1, in which VIN=12V, VOUT=3.3V, Lo=1.5 µH, Co=62 µF, and output current ranges from 0.1 A to 8 A with load step under a slew rate of 1.6 A/µs. As shown in FIGS. 7A and 7B, by controlling the integrator based on the transient from light load to heavy load, the undershoot voltage is reduced from 96.6 mV to 68 mV, and the recovery time period is reduced from 775 µs to 138 µs.

Figure 8A:
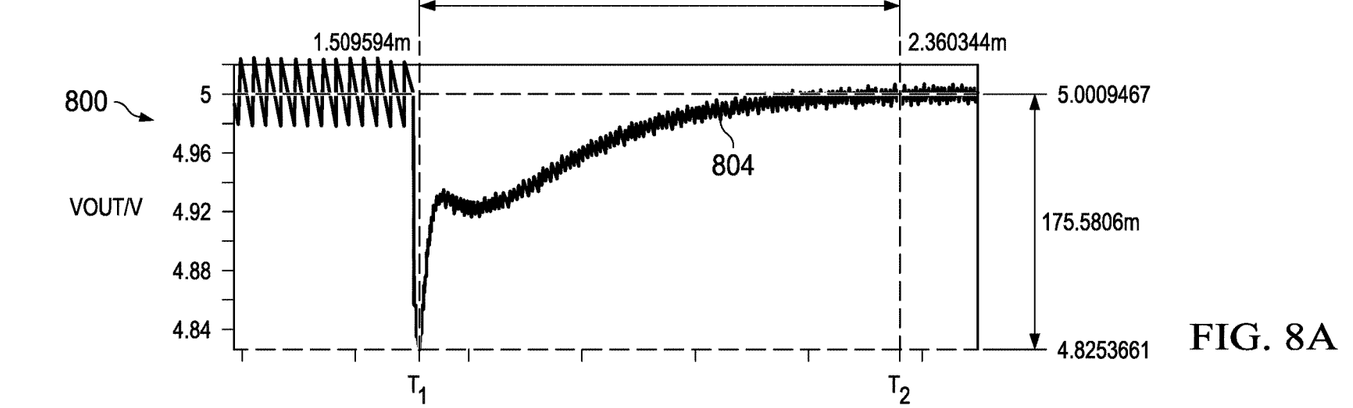
FIG. 8A is yet another diagram of a simulation waveform of a DC-DC converter of FIG. 4 switching from a light load condition and to a heavy load condition.
Figure 8B:
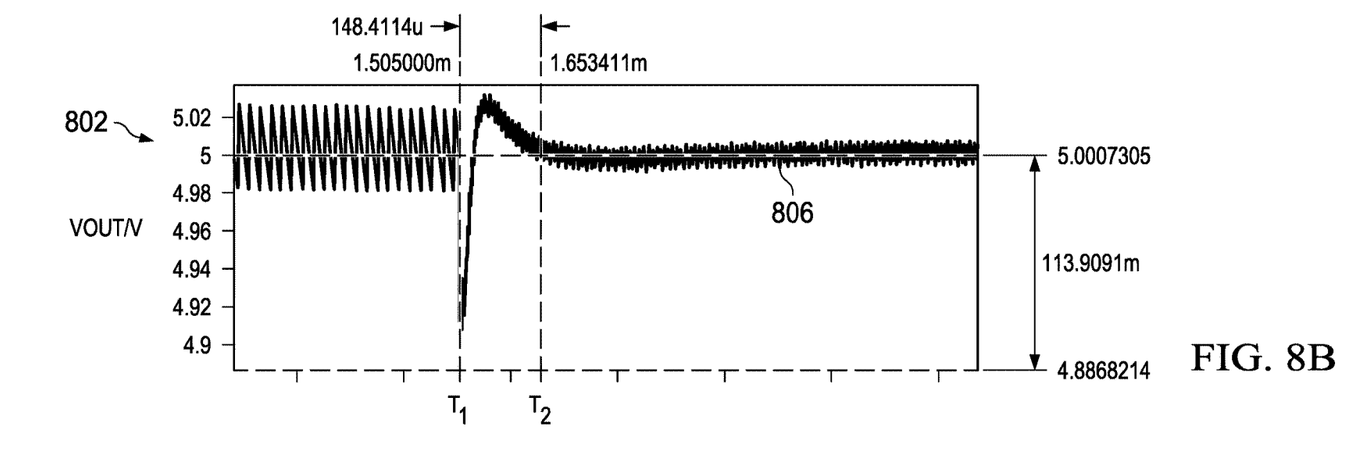
FIG. 8B is yet another diagram of a simulation waveform of a DC-DC converter of FIG. 1 switching from a light load condition and to a heavy load condition.

FIGS. 8A and 8B show diagrams 800 and 802 of yet another light load to heavy load transient simulation comparison between output voltages 804 and 806 of the DC-DC converter 400 of FIG. 4 and the converter system 100 of FIG. 1, in which VIN=12V, VOUT=5V, Lo=2.2 µH, Co=52 µF, and output current ranges from 0.1 A to 8A with load step under a slew rate of 1.6 A/µs. As shown in FIGS. 8A and 8B, by controlling the error integrator based on the transient from light load to heavy load, the undershoot voltage is reduced from 175 mV to 113 mV, and the recovery time period is reduced from 850 µs to 148 µs.

Figure 9:
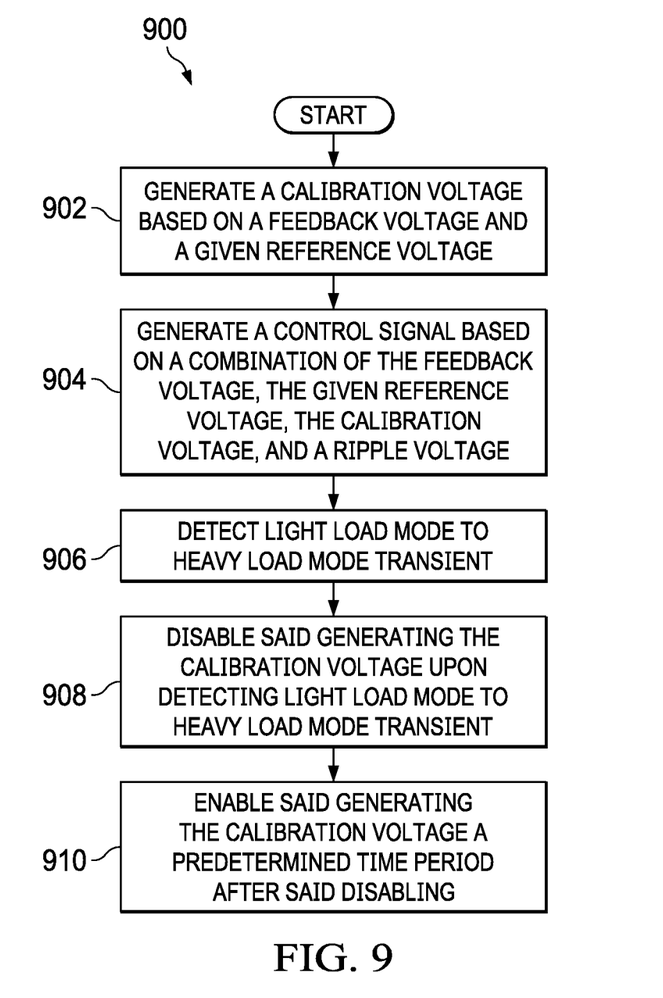
FIG. 9 is a flow chart of a method of operating a DC-DC converter in accordance with another embodiment of this description.

FIG. 9 is a flow chart 900 of a method of operating a DC-DC converter system in accordance with another embodiment of this description with reference to the DC-DC converter system 100 of FIG. 1.

Starting at step 902, the calibration circuitry 112 generates a calibration signal VEA by integrating a difference between a feedback voltage VFB and a reference voltage VREF. In one example, generating the calibration signal VEA includes: generating an integrated signal by integrating the difference between the feedback voltage and the reference voltage, and generating the calibration signal proportional to a difference between the integrated signal and a bias signal Vbias.

At step 904, the control circuitry 106 generates a control signal based on a combination of the feedback voltage VFB, the reference voltage VREF, the calibration signal VEA and a periodic signal, such as a ripple voltage Vripple in phase with the inductor current IL, based on a voltage VSW at the switch terminal SW.

At step 906, the detection circuitry 118 detects a transient from a first load condition to a second load condition, such as a transient from a light load condition to a heavy load condition. In one example, the transient is detected by detecting a valley value of an inductor current IL of the output inductor 108 (which flows from the switch terminal SW to the output terminal VOUT) increasing above zero when the second switch 104 is on. In one example of this description, the transient is detected by detecting a voltage VSW at the switch terminal SW becoming less than zero when the second switch 104 is switched on.

At step 908, responsive to detecting the transient from the light load condition to heavy load condition, the calibration signal VEA is set to and kept at a particular value. In one example, the enable circuitry 116 disables and resets the calibration circuitry 112.

At step 910, after a particular time period, the enable circuitry 116 enables the calibration circuitry 112. In one example, the particular time period is a particular number of cycles (such as N cycles, wherein N is an integer greater than zero) of a clock signal generated based on a switching frequency of the DC-DC converter system 100. In one example, the particular number N can be configured based on a loop delay of the DC-DC converter system 100. In one example, the particular number N can be a fixed value, such as eight.

In this description, the term "couple" may cover connections, communications, or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C, if intervening component C does not alter the functional relationship between device A and device B, such that device B is controlled by device A via the control signal generated by device A.

Modifications are possible in the described examples, and other examples are possible, within the scope of the claims.

What is claimed is:

1. A voltage converter system, comprising:
    a switch coupled to an inductor, and configured to switch between first and second states responsive to a control signal;
    calibration circuitry that includes:
        an integrator having first and second integrator inputs and an integrator output, wherein the first integrator input is coupled to a feedback terminal providing a feedback voltage, and the second integrator input is coupled to a reference terminal providing a reference voltage, the integrator including:
            an error amplifier having an amplifier output and first and second amplifier inputs, wherein the first amplifier input is coupled to the feedback terminal, and the second amplifier input is coupled to the reference terminal;
            a capacitor coupled between the first amplifier input and the integrator output;
            a first enable switch coupled between the feedback terminal and the first amplifier input, wherein the first enable switch is controlled by an enable signal;
            a second enable switch coupled between the amplifier output and the integrator output, wherein the second enable switch is controlled by the enable signal; and
            a disable switch coupled between the first amplifier input and the second amplifier input, wherein the disable switch is controlled by a disable signal; and
        output circuitry coupled to the integrator output, wherein the output circuitry is configured to provide a calibration signal proportional to the integrator output;
    wherein the calibration signal is set to a particular value for a particular time responsive to a transient occurring from a first load condition of the voltage converter system to a second load condition of the voltage converter system; and
    control circuitry coupled to the calibration circuitry, wherein the control circuitry is configured to provide the control signal responsive to a combination of the feedback voltage, the reference voltage, the calibration signal, and a periodic signal.

2. The voltage converter system of claim 1, further comprising:
    detection circuitry coupled to the switch and configured to provide a detection signal at a detection circuit output responsive to the transient; and
    enable circuitry coupled to the calibration circuitry and configured to: disable and reset the calibration circuitry responsive to the detection signal; and enable the calibration circuitry at the particular time after the disabling of the calibration circuitry.

3. The voltage converter system of claim 2, wherein the detection circuitry is configured to detect the transient responsive to an inductor current through the inductor, and the periodic signal is a ripple voltage proportional to the inductor current.

4. The voltage converter system of claim 1, wherein the error amplifier is a first error amplifier, the amplifier output is a first amplifier output, the disable switch is a first disable switch, and the output circuitry includes:
    first and second bias resistors coupled in series between the integrator output and a bias voltage terminal;
    a second error amplifier having third and fourth amplifier inputs and a second amplifier output, wherein the third amplifier input is coupled to the first and second bias resistors, and the fourth amplifier input is coupled to the bias voltage terminal; and
    a second disable switch coupled between the third amplifier input and the fourth amplifier input, wherein the second disable switch is controlled by the disable signal.

5. The voltage converter system of claim 2, wherein the enable circuitry includes:
    a counter having an enable input, a clock input and a counter output, wherein the enable input is coupled to the detection circuit output, the clock input is coupled to a clock terminal which provides a clock signal, and the counter is configured to provide at the counter output a timing signal at a particular number of cycles of the clock signal after the counter is enabled; and
    logic circuitry coupled to the counter and the detection circuitry, wherein the logic circuitry is configured to provide the enable and disable signals, the disable signal is asserted and the enable signal is de-asserted responsive to the detection signal, and the disable signal is de-asserted and the enable signal is asserted responsive to the timing signal.

6. A control circuit for a voltage converter system, the control circuit comprising:
- calibration circuitry configured to provide a calibration signal at a calibration output, wherein the calibration signal is set to a particular value for a particular time responsive to a transient occurring from a first load condition to a second load condition;
- control circuitry coupled to the calibration circuitry and to a switch, wherein the control circuitry is configured to provide a control signal at a control circuit output responsive to a combination of a feedback voltage, a reference voltage, the calibration signal, and a periodic signal;
- detection circuitry coupled to the switch, wherein the detection circuitry is configured to provide a detection signal at a detection circuit output responsive to the transient; and
- enable circuitry coupled to the calibration circuitry, wherein the enable circuitry is configured to disable and reset the calibration circuitry responsive to the detection signal, and to enable the calibration circuitry at the particular time after disabling the calibration circuitry, the enable circuitry including:
  - a counter having a counter output, an enable input and a clock input, wherein the enable input is coupled to the detection circuit output, and the clock input is coupled to a clock terminal that provides a clock signal, the counter being configured to provide a timing signal at the counter output a particular number of cycles of the clock signal after the counter is enabled; and
  - logic circuitry coupled to the counter and to the detection circuitry, wherein the logic circuitry is configured to provide an enable signal and a disable signal, the disable signal is asserted and the enable signal is de-asserted responsive to the detection signal, and the disable signal is de-asserted and the enable signal is asserted responsive to the timing signal.

7. The control circuit of claim 6, wherein the detection circuitry is configured to detect the transient responsive to an inductor current through the inductor, and the periodic signal is a ripple voltage proportional to the inductor current.

8. The control circuit of claim 6, wherein the calibration circuitry includes comprises:
- an integrator having an integrator output at which the integrator is configured to provide an integrated signal by integrating a difference between the feedback voltage and the reference voltage; and
- output circuitry coupled to the integrator output and configured to provide the calibration signal, wherein the calibration signal is proportional to the integrated signal.

9. The control circuit of claim 8, wherein the integrator includes:
- a first enable switch having first and second switch terminals, wherein the first switch terminal is coupled to a feedback terminal providing the feedback voltage, and the first enable switch is controlled by an enable signal;
- an error amplifier having an amplifier output and first and second amplifier inputs, wherein the first amplifier input is coupled to the second switch terminal, and the second amplifier input is coupled to a reference terminal providing the reference voltage;
- a capacitor coupled between the first amplifier input and the integrator output;
- a second enable switch coupled between the amplifier output and the integrator output, wherein the second enable switch is controlled by the enable signal; and
- a disable switch coupled between the first amplifier input and the second amplifier input, wherein the disable switch is controlled by a disable signal.

10. The control circuit of claim 9, wherein the error amplifier is a first error amplifier, the amplifier output is a first amplifier output, the disable switch is a first disable switch, and the output circuitry includes:
- first and second bias resistors coupled in series between the integrator output and a bias voltage terminal;
- a second error amplifier having third and fourth amplifier inputs and a second amplifier output, wherein the third amplifier input is coupled to the first and second bias resistors, and the fourth amplifier input is coupled to the bias voltage terminal; and
- a second disable switch coupled between the third amplifier input and the fourth amplifier input, and controlled by the disable signal.

11. A method of operating a voltage converter system having a switch configured to switch between first and second states responsive to a control signal, the method comprising:
- generating a calibration signal;
- generating the control signal responsive to a combination of a feedback voltage, a reference voltage, the calibration signal, and a periodic signal;
- detecting a transient from a first load condition to a second load condition and, responsive to the transient, disabling generation of the calibration signal for a particular time by shorting first and second inputs of an amplifier together; and
- enabling the generating of the calibration signal after the particular time.

12. The method of claim 11, wherein a load in the first load condition is smaller than a load in the second load condition.

13. The method of claim 12, wherein detecting the transient includes detecting a valley value of an inductor current.

14. The method of claim 11, wherein generating the calibration signal includes:
- generating an integrated signal by integrating a difference between the feedback voltage and the reference voltage; and
- generating the calibration signal, wherein the calibration signal is proportional to a difference between the integrated signal and a bias signal.

* * * * *